Patented Aug. 14, 1923.

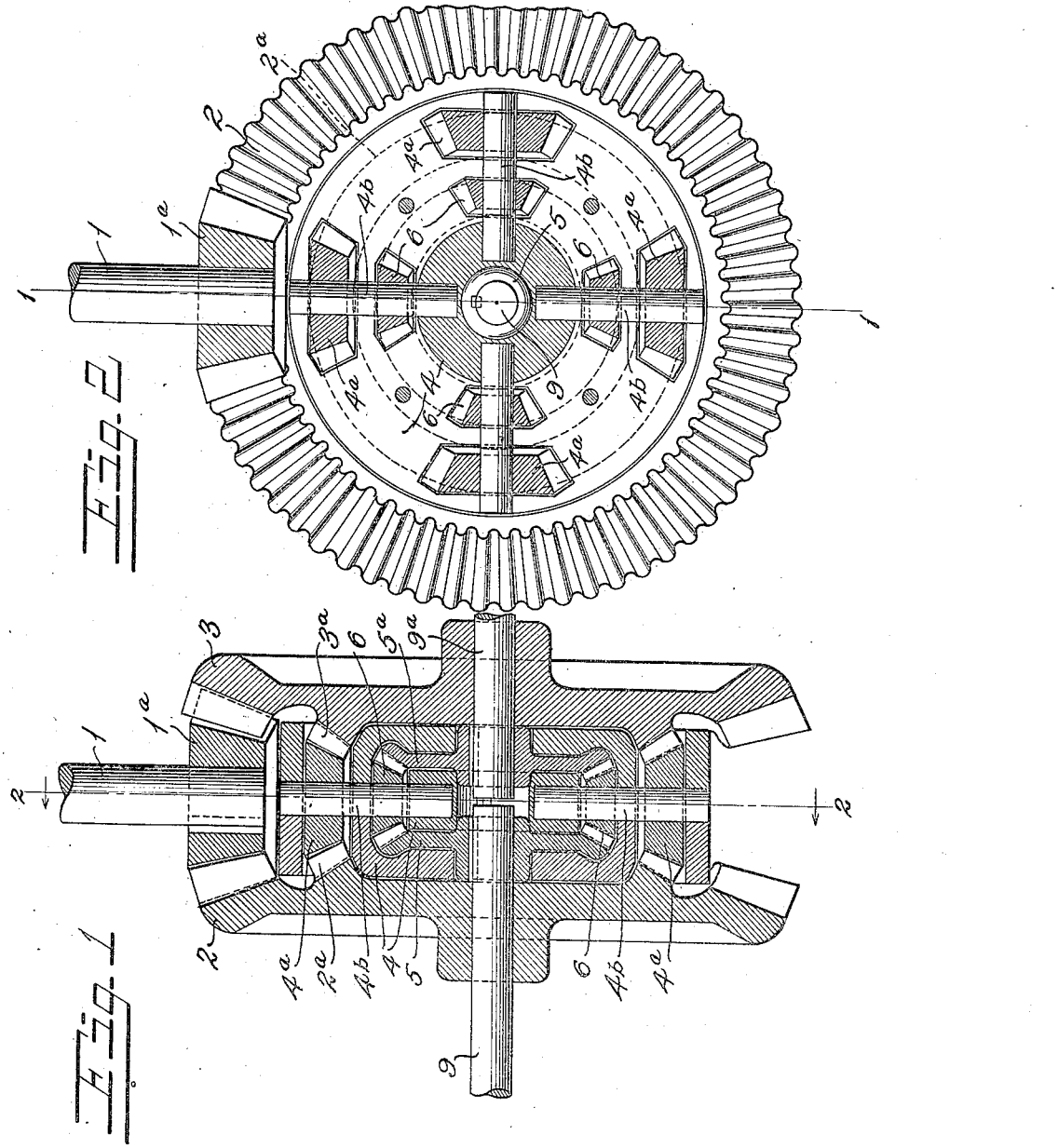

1,464,777

UNITED STATES PATENT OFFICE.

DAVID E. ROSS, OF LAFAYETTE, INDIANA.

BEVEL-GEAR TRANSMISSION GEARING.

Application filed April 3, 1920. Serial No. 370,906.

*To all whom it may concern:*

Be it known that I, DAVID E. ROSS, a citizen of the United States, residing at Lafayette, in the county of Tippecanoe and State of Indiana, have invented certain new and useful Improvements in Bevel-Gear Transmission Gearing; and I hereby declare that the following is a full, clear, and exact description thereof, reference being had to the accompanying drawings, which form part of this specification.

This invention is a novel improvement in gearing for transmitting power from a driving to a driven member. Its object is to make a reducing gear connection between such members, at the same time providing a positive constant geared relation between the driving and driven part whereby the speed of rotation of the driving part may be reduced in transmission to the driven part to any desired predetermined extent or ratio, and consequently the torque transmitted from the driving to the driven part augmented to a corresponding extent.

I will explain the invention with reference to the accompanying drawings which illustrate a practical embodiment thereof sufficient to enable anyone skilled in the art to adapt and use the same; and then summarize in the claims the essentials of the invention, and novel features of construction, and novel combinations of parts for all of which protection is desired.

In said drawings Fig. 1 is a sectional elevation of a transmission gearing on line 1—1, Fig. 2.

Fig. 2 is a transverse sectional view thereof on line 2—2, Fig. 1.

In the form shown the prime mover 1 may be the shaft of an engine, or driven by any suitable motor, not shown.

This shaft carries a bevel gear $1^a$, which meshes with oppositely disposed beveled driving gears 2 and 3, which may be mounted on or in any suitable support; and are shown as rotatably journaled upon the inner ends of axially alined axle members or shafts 9, $9^a$ respectively, which may be supported in any suitable manner. Customarily all the gearing would be enclosed in a protecting housing, not shown, which may be such as is commonly employed to house the transmission gearing of automobiles.

In the example shown the driving gear 2 has formed on or rigidly connected with its inner face a smaller bevel gear $2^a$, and driving gear 3 has formed on or rigidly connected to its inner face a smaller bevel gear $3^a$ opposite bevel gear $2^a$. Interposed between and meshing with bevel gears $2^a$, $3^a$ are a series of planetary gears $4^a$, which are journaled on suitable spindles $4^b$ in a driven member or support 4; the member 4 is rotatably supported concentric to the shafts 9, $9^a$ by any suitable means.

The member 4 is shown as rotatably supported in or upon the hubs of a pair of smaller beveled gears 5, $5^a$, which are respectively fixedly mounted upon the inner ends of the shafts 9, $9^a$; and interposed between and meshing with the gears 5, $5^a$ are a series of smaller planetary gears 6, which are loose on the spindles $4^b$ and located between the shafts 9, $9^a$ and the gears $4^a$. The opposed bevel gears 5, $5^a$, and the bevel gears 6, $6^a$, meshing therewith form a compensating gear connection between the shaft members 9, $9^a$, such compensating gear acting in the well known manner.

In the example shown in Figs. 1 and 2, the gears 2 and 3 have a different number of teeth according to the desired extent of reduction of speed and augmentation of torque. For example, pinion $1^a$ makes say three revolutions to one of gear 2; gear 2 has, say, 49 teeth and gear 3, say, 50 teeth, so gear 2 will gain one tooth on gear 3 at each revolution of gear 2; thus gear 2 will make 50 revolutions in the time that gear 3 makes 49 revolutions.

Assuming that gears 2 and 3 have a different number of teeth, as stated; and that the gears $2^a$ and $3^a$ are similar in size and in number of teeth, then the planetary gears $4^a$ will take up orbital movement in the direction of rotation of the faster gear 2; and will make one complete orbital revolution for every 49 revolutions of the gear 2.

This orbital movement of the planetary gears $4^a$ is transmitted through the driven member 4 to the compensating gear (5, $5^a$, 6, $6^a$) which will cause the axle members or shaft sections 9, $9^a$ to rotate with the driven member at the orbital speed of the planetary gears $4^a$.

In the example given, the prime mover shaft 1 makes 3 rotations to one of the gear 2; and the latter makes 49 rotations to one complete orbital movement of the planetary gears or one rotation of the driven member 4. Consequently the driven member only rotates once, in the example shown, for every 147 rotations of the shaft 1. Obviously also the gears $2^a$, and $3^a$, might be made with a different number of teeth as well as the gears 2 and 3; and this would further vary the speed transmitted between the driven and the driving member.

The ratio of speed between the driving members 2 and 3 and driven member 4 depends upon the ratios of the gearing; and by varying the number of teeth in the gears $1^a$ and 2 and 3; or 2 and 3; or $2^a$, $3^a$; or all; the ratio of reduction of speed and amplification of torque between the prime mover 1 and driven shafts 9, $9^a$ can be varied.

The planetary gears and driven member will always take up rotation in the direction of the intermediate gear $2^a$ or $3^a$ whose teeth move fastest. Obviously the gears 2, 3 may be made with the same number of teeth and the gears $2^a$, $3^a$ made with a different number of teeth, and the effect would be the same, if the proportionate change in gearing was preserved.

Where the opposed gears as 2, and 3; or $2^a$, $3^a$ have different numbers of teeth and are axially alined, it would theoretically, and practically in some cases, be better to have the axis or axes of the intermediate gear or gears meshing therewith inclined slightly to the axes of the opposed gears; as this would enable such intermediate gear or gears to mesh uniformly with the teeth of both the opposed gears, without any possibility of clashing; whereas if the opposed gears (as 2 and 3) have the same axial center, but different numbers of teeth, and the intermediate gear, as $1^a$, is journaled perpendicular to the axes of the opposed gears, there is a tendency to clash which tendency would increase in proportion to the difference in the number of the teeth of the opposed gears.

It is obvious that the invention is not limited to any particular size or arrangement or proportion of the gearing, all of which could be varied in accordance with the difference in speed or augmentation of torque which it is desired to obtain between the driving and the driven parts. The direction of rotation of the driven member always follows the direction of the orbital rotation of the planetary gears; and the planetary gears take up orbital movement in the direction of rotation of the fastest moving gear teeth with which they mesh.

In the example shown, the planetary gears move in the direction of rotation of the gears 2, because the gear 2 has a less number of teeth. By varying the gear ratios between the driving member and the driven member any predetermined relative reduction of speed may be obtained between the driving and the driven members, either forward or reverse.

What I claim is:

1. In a transmission gearing of the character specified; two opposed driving bevel gears; a primary driving shaft; a pinion thereon directly meshing with said opposed bevel gears; opposed smaller beveled gears fixedly connected with the opposed driving gears; a driven member; a pair of opposed axially alined shaft sections; a compensating gearing connecting said shaft sections; and connected with the driven member; and planetary gears connected with the driven member and meshing with the opposed smaller beveled gears, substantially as described.

2. A transmission gearing comprising opposed bevel driving gears of different size having a definite positive relative speed ratio; a driven member; smaller opposed bevel gears connected with the said driving gears; and planetary gears connected with the driven member and meshing with the opposed smaller bevel gears; with a pair of opposed axially alined shaft sections; and a compensating gearing between said shaft sections and connected with the driven member, substantially as described.

3. A transmission gearing of the character specified comprising opposed positively and oppositely driven gears having a definite relative speed ratio; a pair of driven members; opposed bevel gears connected with the said positively driven gears; a compensating gearing connected with the said driven members and planetary gears connected with the compensating gearing and meshing with said opposed bevel gears; at least one of the opposed gears in one pair having a less number of teeth than the other gear in said pair.

In testimony that I claim the foregoing as my own, I affix my signature.

DAVID E. ROSS.